United States Patent [19]
Ohtsuka

[11] Patent Number: 5,485,275
[45] Date of Patent: Jan. 16, 1996

[54] APPARATUS AND METHOD FOR MEASURING THE ERROR OF AN APPARATUS WHICH MEASURE A CYLINDRICAL SHAPE USING AN INTERFEROMETER

[75] Inventor: Masaru Ohtsuka, Yokohama, Japan

[73] Assignee: Canon Kabushiki Kaisha, Tokyo, Japan

[21] Appl. No.: 73,305

[22] Filed: Jun. 8, 1993

[30] Foreign Application Priority Data

Jun. 17, 1992 [JP] Japan ..................................... 4-184508
May 14, 1993 [JP] Japan ..................................... 5-136885

[51] Int. Cl.$^6$ .................................................... G01B 9/02
[52] U.S. Cl. ............................................ 356/360; 356/359
[58] Field of Search .................................. 356/359, 360, 356/345

[56] References Cited

U.S. PATENT DOCUMENTS 5,033,855   7/1991   Matsui ..................................... 356/359

FOREIGN PATENT DOCUMENTS 0244306   9/1989   Japan ..................................... 356/359

OTHER PUBLICATIONS

Truax, "Absolute Interferometric Testing of Spherical Surfaces," SPIE vol. 966 Advances in Fabrication and Metrology for Optics and Large Optics (1988), pp. 130–137.

Bruning, et al., "Digital Wavefront Measuring Interferometer for Testing Optical Surfaces and Lenses," Applied Optics vol. 13, No. 11, Nov. 1974, pp. 2693–2703.

"Interferometry", McGraw–Hill Encyclopedia of Science & Technology, 6th Edition, 1980, pp. 229–234.

Primary Examiner—Samuel A. Turner
Attorney, Agent, or Firm—Fitzpatrick, Cella, Harper & Scinto

[57] ABSTRACT

An apparatus for measuring a shape, such as a cylindrical shape, and an apparatus for measuring system errors of that apparatus are provided. When a cylindrical light wavefront is made incident on an object to be measured and the shape of the object to be measured is measured by utilizing the interference fringes produced on the basis of a difference between the cylindrical light wavefront and the surface shape of the object to be measured, measurement is conducted at least three times beforehand under different light wavefront incident conditions on the predetermined object to be measured, and the system errors of the entire apparatus are calculated using the interference fringe data obtained in these three measurement operations. The errors generated in subsequent measurement operations can be corrected using the obtained system errors.

12 Claims, 8 Drawing Sheets

APPARATUS AND METHOD FOR MEASURING THE ERROR OF AN APPARATUS WHICH MEASURE A CYLINDRICAL SHAPE USING AN INTERFEROMETER

BACKGROUND OF THE INVENTION

1. Field of the Invention

The present invention relates to a cylindrical shape measuring apparatus for measuring the surface state (surface shape) of, for example, a cylindrical lens or cylindrical mirror by utilizing interference, as well as a method of measuring the system errors of such an apparatus. More specifically, the present invention pertains to a cylindrical shape measuring apparatus which is capable of measuring the surface shape accurately and two-dimensionally by removing the system errors inherent in the apparatus.

2. Description of the Related Art

There has been a demand for an apparatus capable of measuring the optical surface of an optical member, such as a cylindrical lens or a cylindrical mirror, with a high degree of accuracy, e.g., on the order of one-tenth of a wavelength or less. Various interference measuring apparatuses (light wave interferometers) of the type which utilize the interference principle, are extensively used as such an apparatus for measuring the optical surface. Particularly, various types of interference measuring apparatuses capable of accurate and quantitative measurement have been put into practical use in recent years owing to the wide use of lasers exhibiting excellent coherence and the development of electronics.

However, in the measuring operation by the interference measuring apparatus, since a difference of two surface shapes is read, if one of the surfaces is not an ideal one, the measuring operation must be conducted a few times under different measuring conditions so as to obtain surface shape errors in each of the operations by analyzing the results of the measurement.

In such a light wave interferometer, absolute accuracy is guaranteed by measuring error components inherent in the interferometer, which are generated by manufacturing errors of the optical parts constituting the interferometer, called system errors, and then by subtracting the measured inherent error components from the shape measuring data of an object to be measured, such as a lens or a mirror. Such an absolute accuracy guaranteeing method, which is used for a Twyman-Green interferometer, has been disclosed by J. H. Bruning in APPLIED OPTICS Vol. 13, No. 11 (1974) 2693. The absolute accuracy guaranteeing method for a Fizeau interferometer has been disclosed by B. E. Truax in SPIE Vol. 966 (1988) 130.

FIG. 1 schematically shows a typical Twyman-Green interferometer.

In FIG. 1, reference numeral 101 denotes a He-Ne laser, which serves as a light source, reference numeral 102 denotes a beam expander for expanding the aperture of an incident beam, and reference numeral 103 denotes a polarization beam splitter which constitutes the interferometer. Reference numerals 104a and 104b denote quarter-wave plates for rotating the angle of polarization by 90 degrees between the rays of light that are incident thereon for the first time and the rays of light that are incident thereon for the second time. Reference numeral 105 denotes a reference mirror, reference numeral 110 denotes a condenser lens for generating a reference spherical surface, and reference numeral 106 denotes an object to be measured. Reference numeral 107 denotes a polarizing plate, reference numeral 108 denotes a CCD camera for observing an interference fringes, and reference numeral 109 denotes a computer for operating interference fringe image.

In the thus-arranged structure, the coherent rays of light emerging from the light source 101 are expanded by the beam expander 102 in terms of the aperture, and then are incident on the polarization beam splitter 103 which divides the incident rays of light into a light La, which propagates toward the reference mirror 105, and a light Lb, which is directed toward the object to be measured 106.

The light La, which is directed toward the reference mirror 105, emerges from the quarter-wave plate 104a circularly polarized. The circularly-polarized light that is reflected by the reference mirror 105 passes through the quarter-wave plate 104a again. The quarter-wave plate 104a rotates the angle of polarization by 90 degrees between the light that has passed therethrough for the first time and the light that has passed therethrough for the second time. The introduced plane-polarized light passes through the polarization beam splitter 103 and propagates toward the CCD camera 108.

The light Lb, which is directed toward the object to be measured 106, emerges from the quarter-wave plate 104b circularly polarized. The circularly-polarized light is converted into a spherical wave by the condenser lens 110, and is then reflected by the object to be measured 106 having a spherical shape. The reflected light passes through the condenser lens 110 and then the quarter-wave plate 104b again. The quarter-wave plate 104b rotates the angle of polarization by 90 degrees between the light that is incident thereon for the first time and the light that is incident thereon for the second time. The plane-polarized light emerging from the quarter-wave plate 104b is reflected by the polarization beam splitter 103, whereby it is directed toward the CCD camera 108. At that time, the two plane-polarized lights La and Lb, which are perpendicular to each other, are caused to interfere by the action of the polarizing plate 107. The resultant interference fringes are observed on the CCD camera 108.

The observed interference fringes are considered to be the display of contours whose intervals are one half the wavelength and which represent a difference between the wavefront shape of the wave light, which has been divided by the polarization beam splitter 103 and then reflected by the reference mirror 105, and the wavefront shape of the wave light, which has been divided by the polarization beam splitter 103 and then reflected by the object to be measured 106.

Thus, if the reference mirror 105 has an ideal flat surface and if the condenser lens 110 is completely aplanatic, the obtained interference fringes represent the spherical surface errors of the object to be measured 106.

However, it is impossible in a practical way to manufacture an ideal flat surface or an aplanatic lens. Thus, the observed interference fringes contain the flat surface errors of the reference lens 105 and the aberration of the condenser lens 110.

Hence, the previously mentioned article by Bruning has proposed a method of removing the error components inherent in the interferometer, such as the flat surface errors of the reference mirror 105 or the aberration of the condenser lens 110.

In this method, three measurement operations are performed each having measuring systems 1, 2 and 3 shown in FIGS. 2(A), 2(B) and 2(C).

Each of the measurement results $W_1(x, y)$, $W_2(x, y)$ and $W_3(x, y)$ obtained by the corresponding measuring systems 1, 2 and 3 is considered to be the difference between the wavefront errors in the measuring optical path and those in the reference optical path, and is given by:

$$W_1(x, y) = W_M(x, y) - W_R(x, y) \qquad (1)$$

$$W_2(x, y) = W_M'(x, y) - W_R(x, y) \qquad (2)$$

$$W_3(x, y) = W_C(x, y) - W_R(x, y) \qquad (3)$$

where $W_R$ is the wavefront of the reference light, $W_M$ is the wavefront of the measured light reflected at the surface measuring position in FIG. 2(A), $W_M'$ is the wavefront of the measured light reflected by the object to be measured 106 which has been rotated around the optical axis by 180 degrees, as shown in FIG. 2(B), and $W_C$ is the wavefront of the measured light cat's eye reflected, as shown in FIG. 2 (C). Under the assumption that the wavefront aberration does not change as the wave light propagates, $W_R$, $W_M$, $W_M'$ and $W_C$ are given by $$W_R(x, y) = W_i(x, y) + W_r(x, y) \qquad (4)$$

$$W_M(x, y) = W_i(x, y) + W_L(x, y) + W_S(x, y) \qquad (5)$$

$$W_M'(x, y) = W_i(x, y) + W_L(x, y) + W_S(-x, -y) \qquad (6)$$

$$W_C(x, y) = W_i(-x, -y) + \{W_L(x, y) + W_L(-x, -y)\}/2 \qquad (7)$$

where $W_i(x, y)$ represents the wavefront errors of the light source, $W_r(x, y)$ represents the wave front errors (x2) of the reference mirror 105, $W_L(x, y)$ represents the wavefront errors (x2) of the condenser lens 120, and $W_S$ represents the wave front error (x2) of the object to be measured 106.

From equations (1) through (7), we have an equation (8) which expresses the system errors as follows:

$$W_L(x, y) - W_r(x, y) = \{W_1(x, y) - W_2(-x, -y) + W_3(x, y) + W_3(-x, -y)\}/2 \qquad (8)$$

where $W_2(-x, -y)$ indicates that the address of the measurement data $W_2$ obtained in the second measuring operation is rotated about the optical axis by 180 degrees.

When the surface shape other than the spherical surface, e.g., the rotation asymmetric surface shape of the object to be measured, such as a cylindrical lens or a cylindrical mirror, is to be measured by the interferometer shown in FIG. 1, a cylindrical wavefront must be generated using a cylindrical lens in the condenser lens.

In that case, the light reflected by the object to be measured in the system indicated by FIG. 2 (C) returns to the condenser lens as the light wavefront which is symmetric with respect to the focusing line.

Therefore, the equation (7) is transformed to $$W_C(x, y) = W_i(x, y) + \{W_L(x, y) + W_L(x, -y)\}/2 \qquad (9)$$

Consequently, the system errors cannot be expressed by the equation (8).

SUMMARY OF THE INVENTION

A primary object of the present invention is to provide a method of measuring the system error required to measure the optical shape of an object to be measured, such as a cylindrical lens or a cylindrical mirror. The present invention also provides an apparatus for measuring the surface shape of the object to be measured with a high degree of accuracy by correcting the system error by using the system error measuring method.

According to one aspect of the present invention, there is provided a method of measuring system error of an apparatus, which measures a cylindrical shape using an interferometer designed to produce interference from a light wave having a cylindrical wavefront and reflected by a cylindrical surface of the cylindrical shape to be measured after it has been emitted from a condenser system. The system error measuring method comprises the steps of: performing a first measurement operation using the interferometer under a condition that focusing line of the condenser system substantially coincides with a center of curvature of a predetermined cylindrical surface; performing a second measurement operation using the interferometer under a condition that a reflecting member is disposed near the focusing line of the condenser system so that the light wave emitted from the condenser system can be made incident on the predetermined cylindrical surface through the reflecting member; performing a third measurement operation using the interferometer under a condition that the predetermined cylindrical surface is disposed near the focusing line of the condenser system and the light from the reflection member is reflected directly to the condenser system; and calculating the system error of the apparatus on the basis of the results of the first, second and third measurement operations.

According to another aspect of the present invention, there is provided an apparatus for measuring a cylindrical shape. The apparatus comprises: an interferometer having a condenser system, the interferometer producing interference from a light beam having a cylindrical wavefront and reflected by a cylindrical surface to be measured after the light wave has been emitted from the condenser system; a detection system for detecting interference fringes generated by the interference produced by the interferometer; and an operation system for measuring the shape of the cylindrical surface to be measured on the basis of the detection of the detection system, the operation system being capable of calculating the system error of the apparatus on the basis of data from the interference fringes obtained using the interferometer under conditions of: (i) a first measurement arrangement of the detection system, wherein a focusing line of the condenser system coincides with a center of curvature of a predetermined cylindrical surface, (ii) a second measurement arrangement of the detection system, wherein a reflecting member is disposed near the focusing line of the condenser system so that the light wave emitted from the condenser system is made incident on the predetermined cylindrical surface through the reflecting member, (iii) a third measurement arrangement of the detection system, wherein the predetermined cylindrical surface is disposed near the focusing line of the condenser system and wherein the light from the reflection member is reflected directly to the condenser system. The operation system stores the calculated system error of the apparatus, and corrects the results of subsequent measurements of the shape of the cylindrical surface to be measured on the basis of the stored data.

Other objects of this invention will become apparent during the following discussion of the accompanying drawings.

DETAILED DESCRIPTION OF THE PREFERRED EMBODIMENTS

An interference measuring apparatus of a first embodiment according to the present invention is designed to make a cylindrical light wavefront which is emerging from a condenser lens system, incident on an object to be measured. The apparatus is designated to detect, by a detection means, interference fringes generated on the basis of a difference between the cylindrical light wavefront and the surface shape of the object to be measured, and to measure the shape of the object to be measured by utilizing a signal from the detection means. At that time, measurement is conducted at least three times beforehand under different light wavefront-entering conditions on a predetermined object, and the system errors of the entire apparatus are calculated using the interference fringe data obtained in these three measurement operations. The errors generated in subsequent measurement operations can be corrected using the obtained system errors. Among the above-mentioned three measurement operations, the first measurement operation is conducted by making the cylindrical light wavefront, from the condenser lens system, incident on the predetermined object, after it has been deflected sideways by utilizing a plane mirror movably or detachably provided near the focusing line of the condenser lens system. The second measurement operation is conducted by the system the focusing line of the condenser lens system is substantially coincident with the center of the curvature of the predetermined object. The third measurement operation is conducted by the system when the predetermined object is located near the focusing line of the condenser lens system.

In an embodiment which will be described below, measurement is conducted three times, under different light entering conditions, on the predetermined object to obtain measurement data $W_1(x, y)$, $W_2(x, y)$ and $W_3(x, y)$, and the system errors of the interferometer system having a condenser lens for generating a cylindrical wavefront are calculated by the following equation:

$$W_L(x, y) - W_r(x, y) = \{W_1(x, y) - W_2(x, -y) + W_3(x, y) + W_3(x, -y)\}/2 \quad (10)$$

Figure 1:
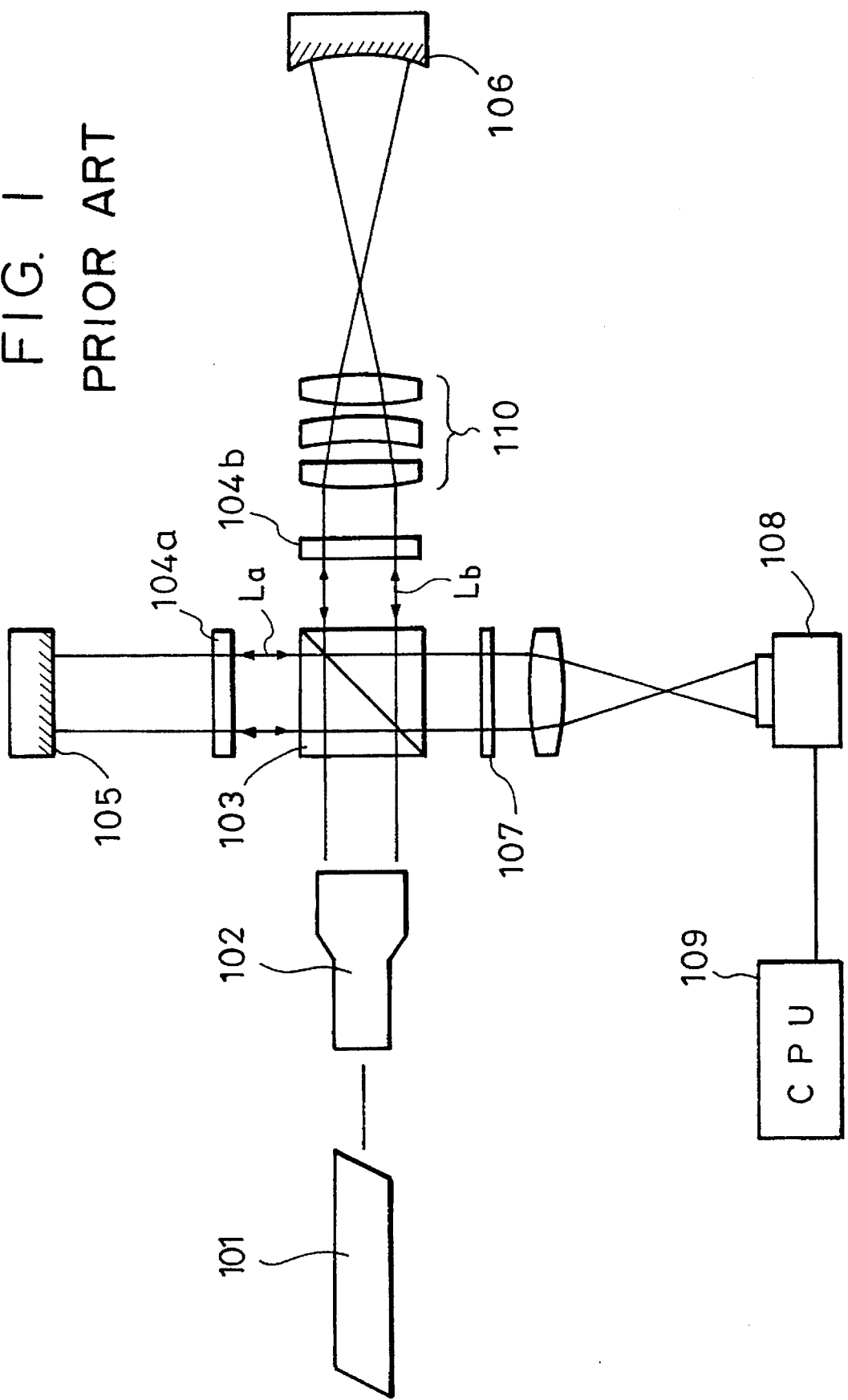
FIG. 1 is a schematic view of the essential parts of a conventional interference measuring apparatus.
Figure 2A:
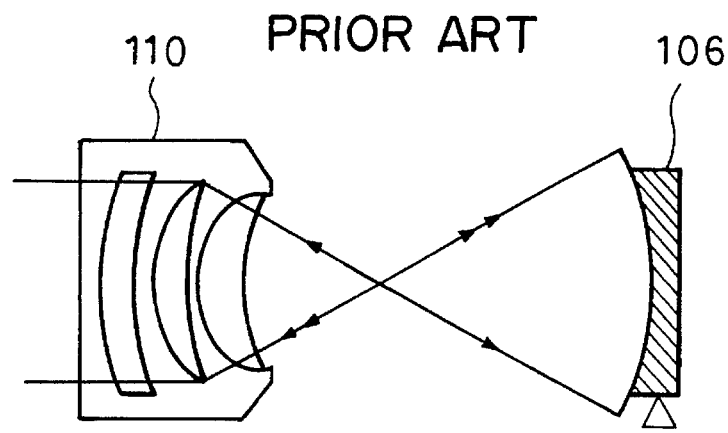
FIGS. 2A through 2C illustrate a portion of the apparatus of FIG. 1.
Figure 2B:
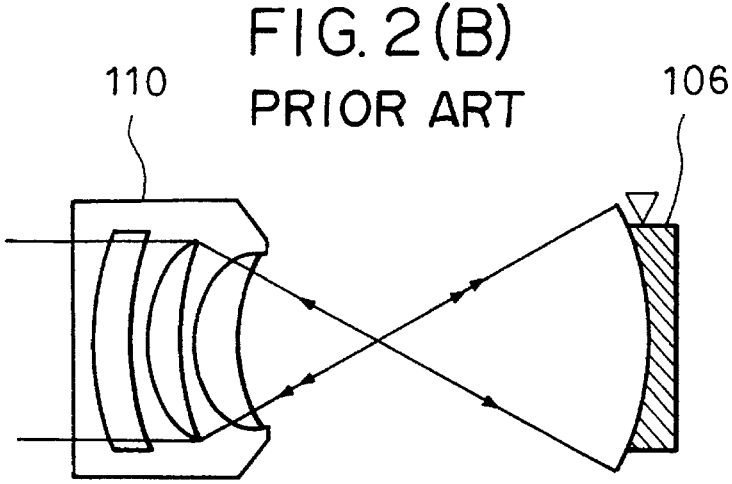
Figure 2C:
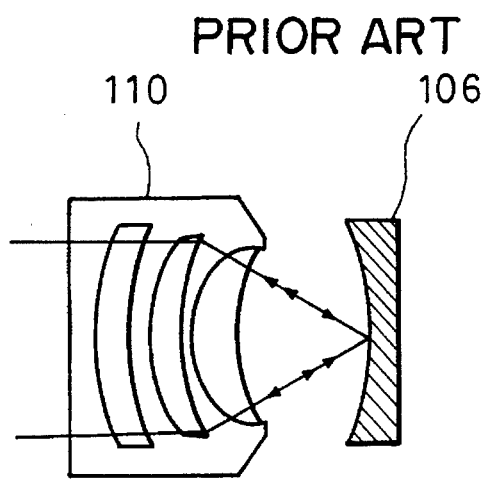
Figure 3:
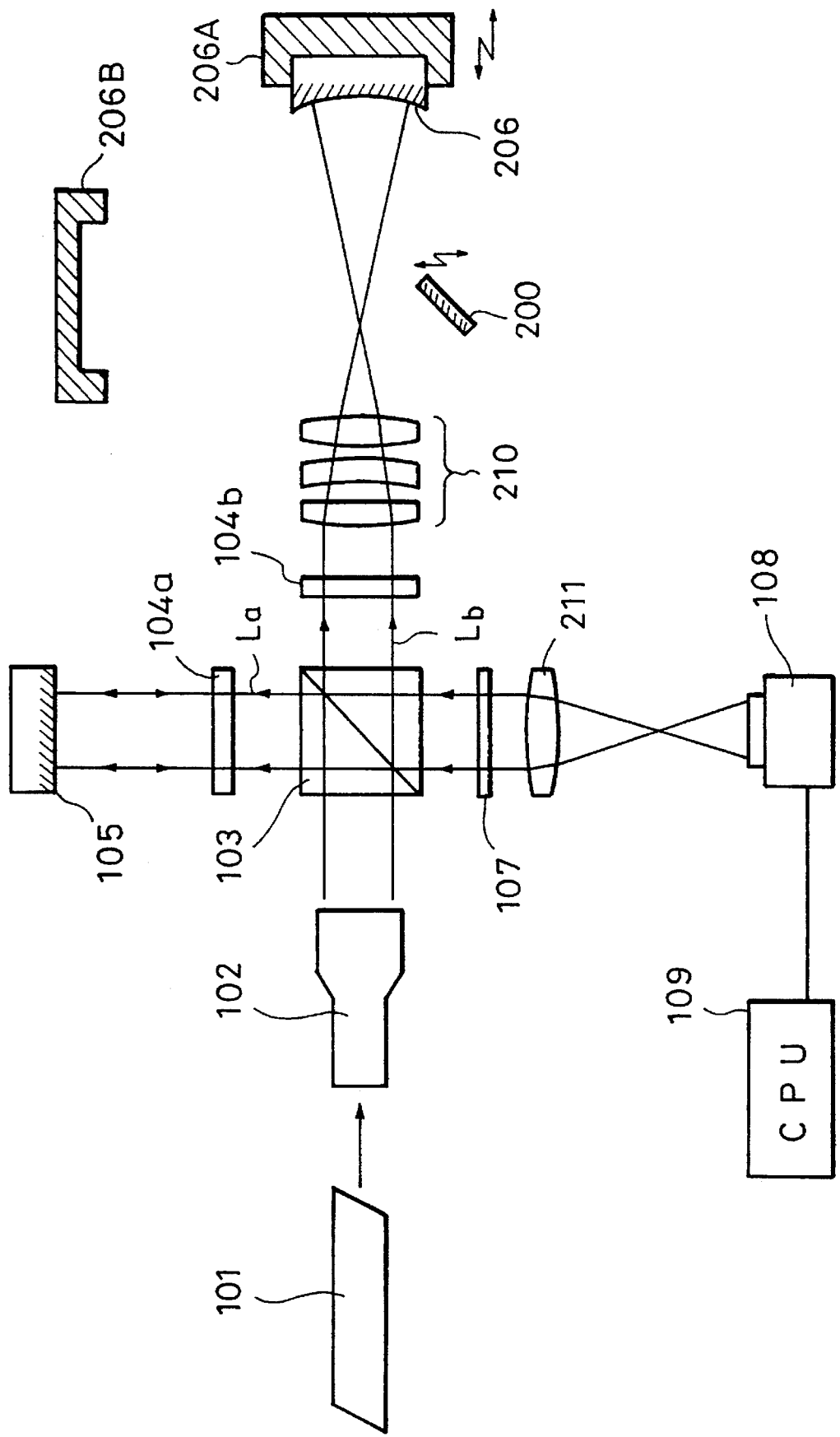
FIG. 3 is a schematic view of the essential parts of a first embodiment according to the present invention.

FIG. 3 is a schematic view of the essential parts of a first embodiment in which the interference measuring apparatus according to the present invention is applied to a Twyman-Green interferometer.

In FIG. 3, reference numeral 101 denotes a laser serving as the light source, reference numeral 102 denotes a beam expander for expanding the aperture of an incident beam, and reference numeral 103 denotes a polarization beam splitter which constitutes the interferometer. Reference numerals 104a and 104b denote quarter-wave plates for rotating the angle of polarization by 90 degrees between the light that is incident thereon for the first time and the light that is incident thereon for the second time. Reference numeral 105 denotes a reference mirror, reference numeral 210 denotes a condenser lens for generating the reference cylindrical wavefront from the incident light, and reference numeral 206 denotes an object to be measured which may be the shape of a portion of a cylinder, such as a cylindrical lens or a cylindrical mirror. Reference numerals 206A and 206B denote jigs for retaining the object to be measured and 200 denotes a plane mirror which will be described later.

Reference numeral 107 denotes a polarizing plate, reference numeral 211 denotes a lens, reference numeral 108 denotes a CCD camera for observing the interference fringes as the detection means, and reference numeral 109 denotes a computer which operates an interference fringe image.

In the above-arranged structure, the coherent rays of light emerging from the light source 101 are expanded by the beam expander 102 in terms of the aperture. The expanded rays of light are made incident on the polarization beam splitter 103 which divides the incident rays of light into a light La, which propagates toward the reference mirror 105, and a light Lb, which is directed toward the object to be measured 206.

The light La, which is directed toward the reference mirror 105, emerges from the quarter-wave plate 104a circularly polarized. The circularly-polarized light that is reflected by the reference mirror 105 passes through the quarter-wave plate 104a again. The quarter-wave plate 104a rotates the angle of polarization by 90 degrees on the light that has passed therethrough for the first time and the light that has passed therethrough for the second time. The introduced plane-polarized light passes through the polarization beam splitter 103 and propagates toward the CCD camera 108.

The light Lb, which is directed toward the object to be measured 206, emerges from the quarter-wave plate 104b circularly polarized. The circularly-polarized light is converted into a cylindrical light wave by the condenser lens 210, and is then reflected by the object to be measured 206 having a cylindrical shape. The reflected light passes through the condenser lens 210 and then the quarter-wave plate 104b again. The quarter-wave plate 104b rotates the angle of polarization by 90 degrees between the light which is incident thereon for the first time and the light which is incident thereon for the second time. The plane-polarized light emerging from the quarter-wave plate 104b is reflected by the polarization beam splitter 103, whereby it is directed toward the CCD camera 108.

At that time, the two lights La and Lb are the plane-polarized lights which are perpendicular to each other. The polarization plate 107 makes the directions of polarization of the two plane-polarized lights La and Lb correspond to each other so that they can interfere. The resulting interference fringes are formed on the CCD camera 108 through the lens 211.

The computer 109 performs operation on the interference fringes formed on the CCD camera 108 to interpolate the phase difference for each of the CCD pixels.

In this embodiment, the surface shape of the object to be measured 206 is measured by the method which will be described below using the above-described apparatus.

Figure 4A:
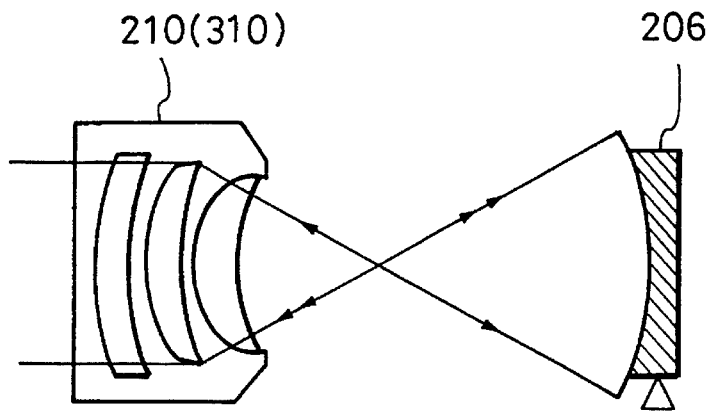
FIGS. 4A through 4C illustrate a portion of the apparatus off FIG. 3.
Figure 4B:
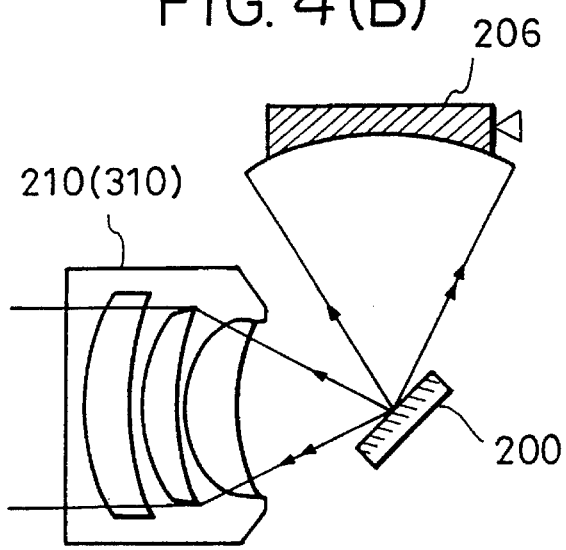
Figure 4C:
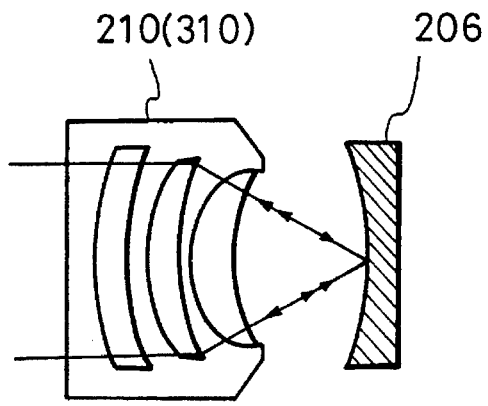

FIGS. 4(A), 4(B) and 4(C) respectively illustrate measurement systems 1, 2 and 3 in which the positional relation between the condenser lens 210 and the object to be measured 206, when the surface shape of the object to be measured 206 is measured, differ from each other.

The plane mirror 200 is disposed movably or detachably near the focusing line of the condenser lens 210.

In this embodiment, the measurement operation is conducted in each of the measuring systems 1, 2 and 3 shown in FIGS. 4(A), 4(B) and 4(C), and the system errors are measured from the results of the measurement operations, which are conducted three times in total. The surface shape errors of the object to be measured 206 are corrected using the obtained system errors.

FIG. 4 (A) shows the measurement system 1 in which the focusing line of the condenser lens 210 is substantially coincident with the focusing line of the object to be measured 206 which is supported by the jig 206A. The measurement data obtained by the CCD camera 108 in this system is $W_1(x, y)$.

FIG. 4 (B) shows the measurement system 2 in which the light is made incident on the object to be measured 206 after it has been deflected by about 90 degrees by the plane mirror 200, which is disposed near the focusing line of the condenser lens 210. The measurement data obtained by the CCD camera 108 in this system is $W_2(x, y)$.

FIG. 4 (C) shows the measurement system in which the object to be measured 206, which is supported by the jig 206A, is disposed near the focusing line of the condenser lens 210 so as to allow the light to be so-called cat's eye reflected. The measurement data obtained by the CCD camera 108 in this system is $W_3(x, y)$. The triangle mark attached to the object to be measured 206 indicates the direction of the object to be measured 206.

In this embodiment, each of the measurement results obtained by the corresponding measuring systems 1, 2 and 3 is considered to be the difference between the wavefront errors in the measuring optical path and those in the reference optical path, and is given by:

$$W_1(x, y) = W_M(x, y) - W_R(x, y) \quad (11)$$

$$W_2(x, y) = W_M'(x, y) - W_R(x, y) \quad (12)$$

$$W_3(x, y) = W_C(x, y) - W_R(x, y) \quad (13)$$

where $W_R$ is the wavefront of the reference light, $W_M$ is the wavefront of the measured light, which has been reflected at the surface measuring position of the object to be measured in the measurement system 1, $W_M'$ is the wavefront of the measured light reflected by the object to be measured 206, which has been bent by about 90 degrees by the plane mirror disposed on the focusing line thereof, and $W_C$ is the wavefront of the measured light cat's eye reflected in the measurement system 3.

Under the assumption that the wavefront aberration does not change as the wave light propagates, $W_R$, $W_M$, $W_M'$ and $W_C$ are given by $$W_R(x, y) = W_i(x, y) + W_r(x, y) \quad (14)$$

$$W_M(x, y) = W_i(x, y) + W_L(x, y) + W_S(x, y) \quad (15)$$

$$W_M'(x, y) = W_i(x, y) + W_L(x, y) + W_S(x, -y) \quad (16)$$

$$W_C(x, y) = W_i(x, -y) + \{W_L(x, y) + W_L(x, -y)\}/2 \quad (17)$$

where $W_i(x, y)$ represents the wave front errors of the light source, $W_r(x, y)$ represents the wavefront errors (x2) of the reference mirror 105, $W_L(x, y)$ represents the wavefront errors (x2) of the condenser lens 210, and $W_S$ represents the wave front errors (x2) of the object to be measured 206.

From equations (11) through (17), we have an equation (18) which expresses the system errors of the entire apparatus as follows:

$$W_L(x, y) - W_r(x, y) = \{W_1(x, y) - W_2(x, -y) + W_3(x, y) + W_3(x, -y)\}/2 \quad (18)$$

In this embodiment, the system errors are calculated by the equation (18), and the calculated system errors are stored in the computer 109 which also serves as the storage means. When various objects to be measured are measured, the measurement errors are corrected using the system errors stored in the storage means (e.g., by subtracting the errors from the measured value). Thus, highly accurate measurement of the surface shape is enabled.

In this embodiment, a cylindrical object to be measured, which is other than the object to be measured 206, may be employed to calculate the system errors.

Furthermore, although the system errors are stored in the storage means in this embodiment, they may be obtained for correction of the measured value each time measurement is conducted.

As mentioned above, a total of three measurement operations are conducted in this embodiment to obtain the measurement data, and the measurement data obtained in respective operations are calculated to obtain the system errors which indicate the error components inherent to the interferometer system. Therefore, the system errors can be corrected in the data obtained in the subsequent measurement operations so as to achieve highly accurate measurement of the surface shape.

Figure 5:
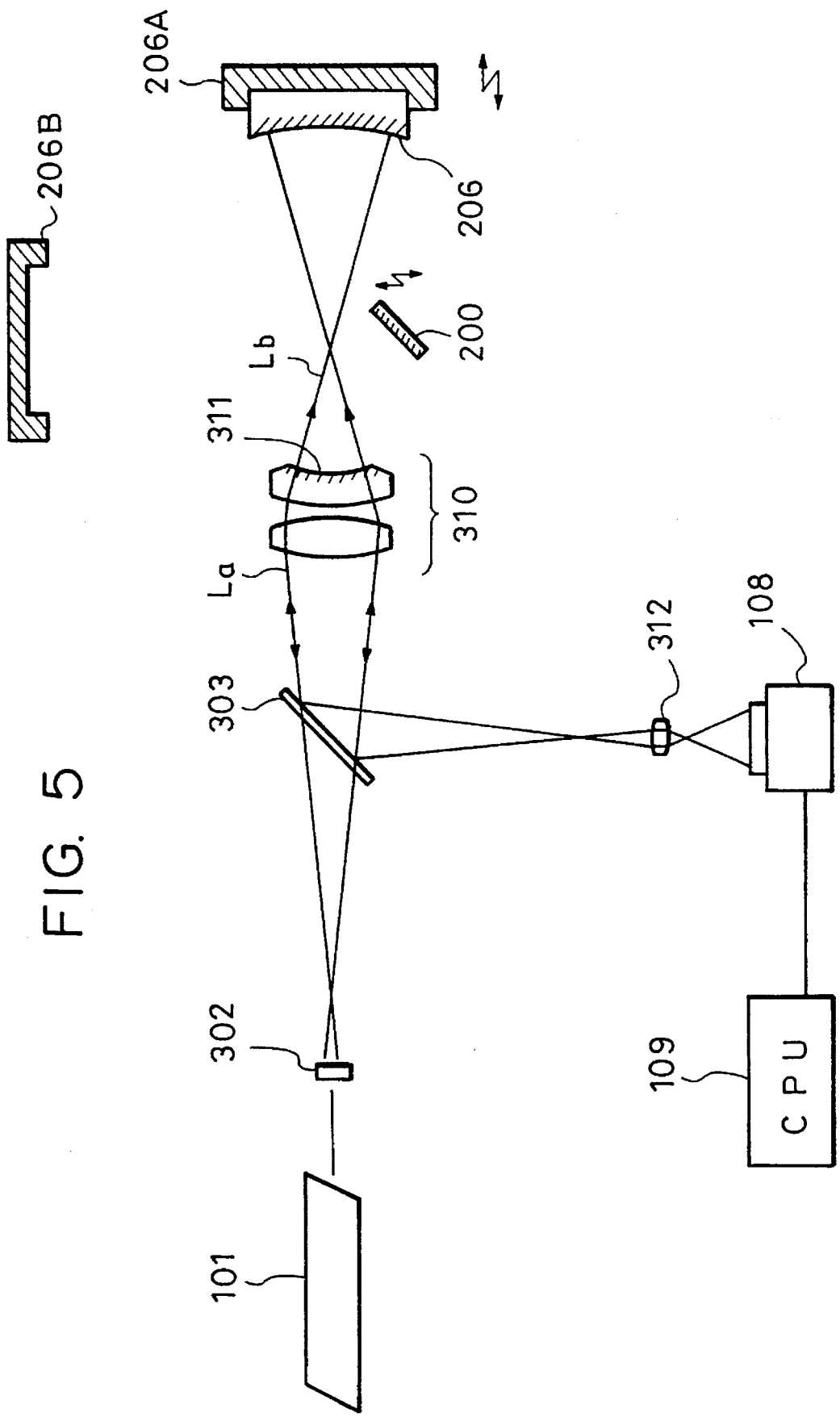
FIG. 5 is a schematic view of the essential parts of a second embodiment according to the present invention.

FIG. 5 is a schematic view of the essential parts of a second embodiment in which the interference measuring apparatus according to the present invention is applied to a Fizeau interferometer.

In the figure, reference numeral 101 denotes a laser serving as the light source, reference numeral 302 denotes a diverging lens for diverging the laser beam coming from the laser 101, and reference numeral 303 denotes a half mirror. Reference numeral 310 denotes a condenser lens for generating a reference cylindrical wavefront from the incident light, reference numeral. 311 denotes the final lens surface of a condenser lens system 310, which serves as a reference surface, and reference numeral 206 denotes an object to be measured having the shape corresponding to part of a cylinder. Reference numeral 312 denotes a lens, reference numeral 108 denotes a CCD camera for observing the interference fringes, reference numeral 109 denotes a computer which operates an interference fringe image.

In the above-arranged structure, the coherent rays of light emerging from the light source 101 are diverged by the diverging lens 302. The condenser lens 310 converts the diverged light, which has passed through the half mirror 303, into a cylindrical light wave. Also, the condenser lens 310 divides the cylindrical light wave into a light La to be reflected by the final lens surface 311 thereof and a light Lb to be directed toward the object to be measured.

The light Lb, which has been directed toward the object to be measured 206, is reflected by the cylindrical object to be measured 206. The reflected light Lb passes through the condenser lens 310 again and is then reflected by the half mirror 303 together with the light La which has been reflected by the final lens surface of the condenser lens 310. The reflected lights La and Lb pass through the lens 312 and form interference fringes on the CCD camera 108. The computer 109 computes the interference fringes formed on the CCD camera 108 to interpolate the phase difference for each of the CCD pixels.

In this embodiment, the system errors are measured in the same manner as that in the measuring systems 1, 2 and 3 respectively shown in FIGS. 4(A), 4(B) and 4(C).

In this embodiment, the measurement data obtained in the measuring systems 1, 2 and 3 respectively shown in FIGS.

4 (A), 4 (B) and 4 (C) are $W_1$ (x, y), $W_2$ (x, y), and $W_3$ (x, y), respectively.

In this embodiment, each of the measurement results obtained by the corresponding measuring systems 1, 2 and 3 is considered to be the difference between the wavefront errors in the measuring optical path and those in the reference optical path, and is given by:

$$W_1(x, y) = W_M(x, y) - W_R(x, y) \quad (19)$$

$$W_2(x, y) = W_M'(x, y) - W_R(x, y) \quad (20)$$

$$W_3(x, y) = W_C(x, y) - W_R(x, y) \quad (21)$$

where $W_R$ is the wavefront of the reference light, $W_M$ is the wavefront of the measured light, which has been reflected at the surface measuring position of the object to be measured in the measurement system 1, $W_M'$ is the wavefront of the measured light reflected by the object to be measured after it has been bent by about 90 degrees by the plane mirror, which is disposed on the focusing line thereof, and $W_C$ is the wavefront of the measured light that is cat's eye reflected in the measurement system 3. Under the assumption that the wave front aberration does not change as the wave light propagates, $W_R$, $W_M$, $W_M'$ and $W_C$ are given by $$W_R(x, y) = W_i(x, y) + W_L(x, y) + n \cdot W_r(x, y) \quad (22)$$

$$W_M(x, y) = W_i(x, y) + W_L(x, y) + (n-1) \cdot W_r(x, y) + W_S(x, y) \quad (23)$$

$$W_M'(x, y) = W_i(x, y) + W_L(x, y) + (n-1) \cdot W_r(x, y) + W_S(x, -y) \quad (24)$$

$$W_C(x, y) = W_i(x, -y) + \{W_L(x, y) + (n-1) \cdot W_r(x, y) + (n-1) \cdot W_r(x, -y) + W_L(x, -y)\}/2 \quad (25)$$

where $W_i$ (x, y) represents the wavefront errors of the light source, $W_r$ (x, y) represents the wavefront errors (x2) of the reference mirror 105, $W_L$ (x, y) represents the wavefront errors (x2) of the condenser lens 310 except for the final lens surface 311, $W_S$ represents the wave front errors (x2) of the object to be measured 206, and n is the refraction factor of the final lens.

From equations (19) through (25), we have an equation (26) which expresses the system errors $[-W_r$ (x, y)] of the entire apparatus as follows:

$$-W_r(x, y) = \{W_1(x, y) - W_2(x, -y) + W_3(x, y) + W_3(x, -y)\}/2 \quad (26)$$

Equation (26) is similar to equation (18). That is, the system errors can be obtained in exactly the same manner in both a Fizeau interferometer system and a Twyman-Green interferometer system according to the present invention.

A cylindrical shape measuring apparatus according to a third embodiment which will be described below, is designed to make a cylindrical light wavefront, which is emerging from a condenser lens system, enter an object to be measured. The embodiment is designed to detect, by a detection means, interference fringes generated on the basis of a difference between the cylindrical light wavefront and the surface shape of the object to be measured, and to measure the shape of the object to be measured by utilizing the signal from the detection means. At that time, measurement is conducted at least three times beforehand under different light wavefront incident conditions on a predetermined object, and the system errors of the entire apparatus are calculated using the interference fringe data obtained in these three measurement operations. The errors generated in subsequent measurement operations can be corrected using the obtained system errors. Among the above-described three measurement operations, the first measurement operation is conducted by the system in which the focusing line of the condenser lens system is substantially coincident with the center of the curvature of the predetermined object. The second measurement operation is conducted by the system in which the cylindrical light wavefront from the condenser lens system is made incident on the predetermined object after it has been deflected sideways by utilizing a plane mirror provided near the focusing line of the condenser lens system. The third measurement operation is conducted by the system designed such that the light to be reflected from the plane mirror disposed near the focusing line of the condenser lens system is reflected directly to the condenser lens system.

Figure 6:
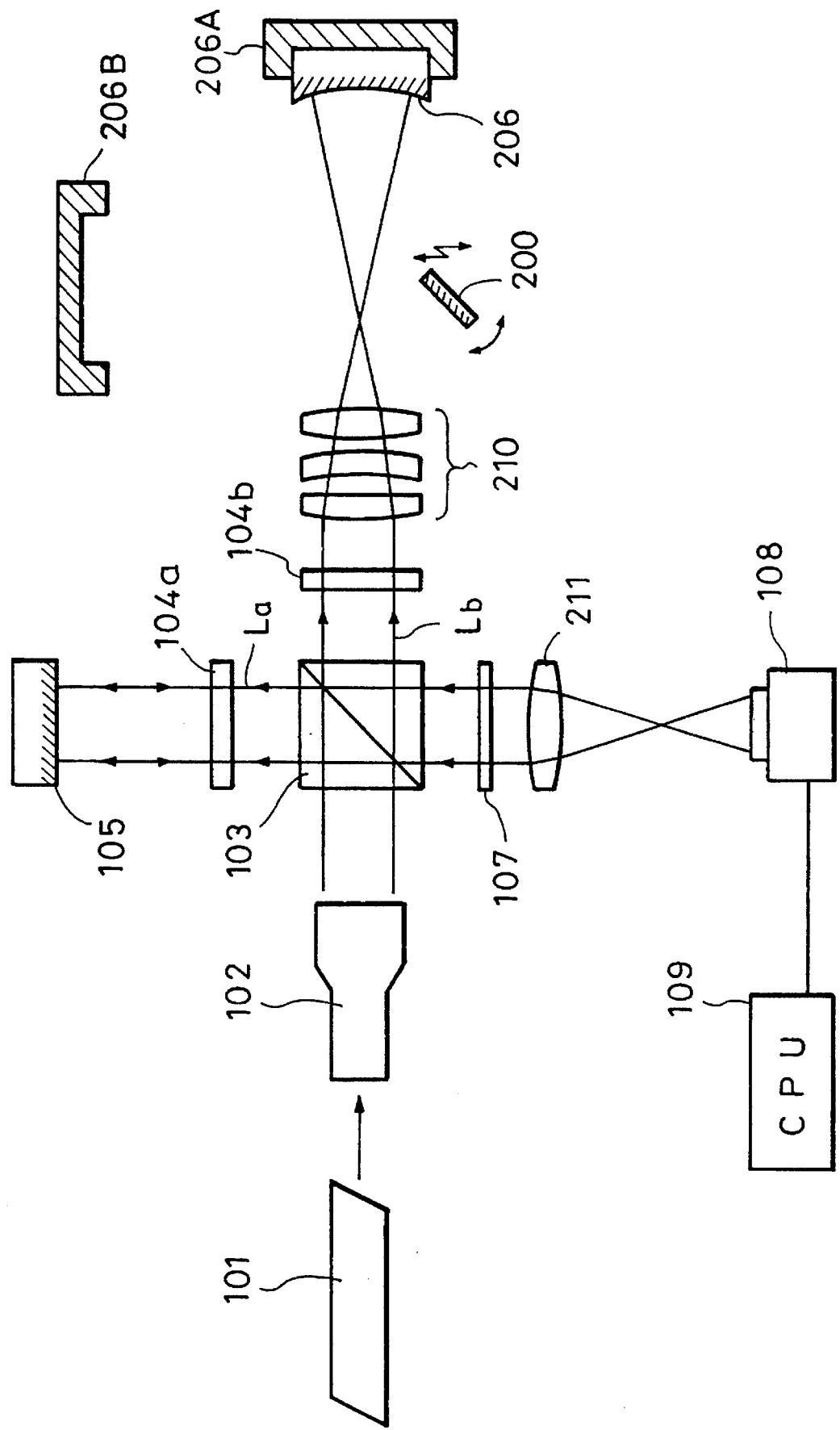
FIG. 6 is a schematic view of the essential parts of a third embodiment according to the present invention.

FIG. 6 is a schematic view of the essential parts of a third embodiment in which the interference measuring apparatus according to the present invention is applied to a Twyman-Green interferometer. This embodiment is effective when the wavefront errors caused by the plane mirror disposed near the focusing line cannot be ignored.

In FIG. 6, reference numeral 101 denotes a laser serving as the light source, reference numeral 102 denotes a beam expander for expanding the aperture of an incident beam, reference numeral 103 denotes a polarization beam splitter, which constitutes the interferometer, and reference numerals 104a and 104b denote quarter-wave plates for rotating the angle of polarization by 90 degrees between the light that is incident thereon for the first time and the light incident thereon for the second time. Reference numeral 105 denotes a reference mirror, reference numeral 210 denotes a condenser lens for generating the reference cylindrical wavefront from the incident light, reference numeral 206 denotes an object to be measured, which may be a portion of a cylinder, such as a cylindrical lens or a cylindrical mirror, reference numerals 206A and 206B denote jigs for retaining the object to be measured, and reference numeral 200 denotes a plane mirror which will be described later.

Reference numeral 107 denotes a polarizing plate, reference numeral 211 denotes a lens, reference numeral 108 denotes a CCD camera for observing the interference fringes as the detection means, and reference numeral 109 denotes a computer which operates an interference fringe image.

In the above-arranged structure, the coherent rays of light emerging from the light source 101 are expanded by the beam expander 102 in terms of the aperture. The expanded rays of light are made incident on the polarization beam splitter 103 which divides the incident rays of light into a light La, which propagates toward the reference mirror 105, and a light Lb, which is directed toward the object to be measured 206.

The light La directed toward the reference mirror 105 emerges from the quarter-wave plate 104a circularly polarized. The circularly-polarized light that is reflected by the reference mirror 105 passes through the quarter-wave plate 104a again. The quarter-wave plate 104a rotates the angle of polarization by 90 degrees between the light that has passed through the plate for the first time and the light that has passed through the plate for the second time. The introduced plane-polarized light passes through the polarization beam splitter 103 and propagates toward the CCD camera 108.

The light Lb, which is directed toward the object to be measured 206 emerges from the quarter-wave plate 104b circularly polarized. The condenser lens 210 converts the circularly-polarized light into a cylindrical light wave. The cylindrical light wave is reflected by the object to be measured 206 having a cylindrical shape. The reflected light passes through the condenser lens 210 and then the quarter-wave plate 104b again. The quarter-wave plate 104b rotates the angle of polarization by 90 degrees between the light that has passed therethrough for the first time and the light that has passed therethrough for the second time. The plane-polarized light emerging from the quarter-wave plate 104b is reflected by the polarization beam splitter 103, whereby it is directed toward the CCD camera 108.

At that time, the lights La and Lb are the plane-polarized lights which are perpendicular to each other. The polarization plate 107 makes the directions of polarization of the two plane-polarized lights La and Lb correspond to each other so that they can interfere. The resulting interference fringes are formed on the CCD camera 108 through the lens 211.

The computer 109 performs an operation on the interference fringes formed on the CCD camera 108 to interpolate the phase difference for each of the CCD pixels.

In this embodiment, the surface shape of the object to be measured 206 is measured by the method, which will be described below, using the above-described apparatus.

Figure 7A:
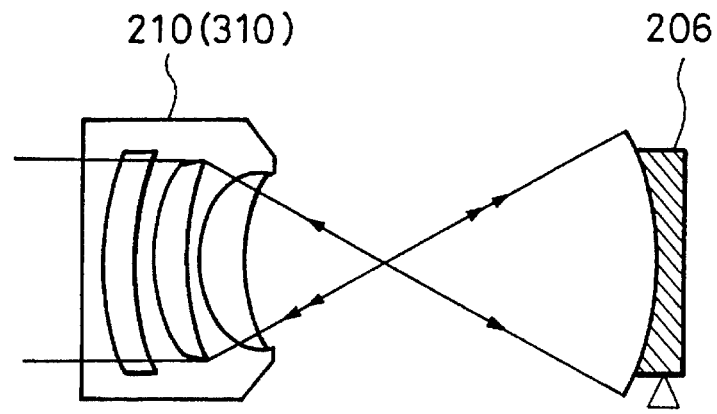
FIGS. 7A through 7C illustrate a portion of the apparatus of FIG. 6.
Figure 7B:
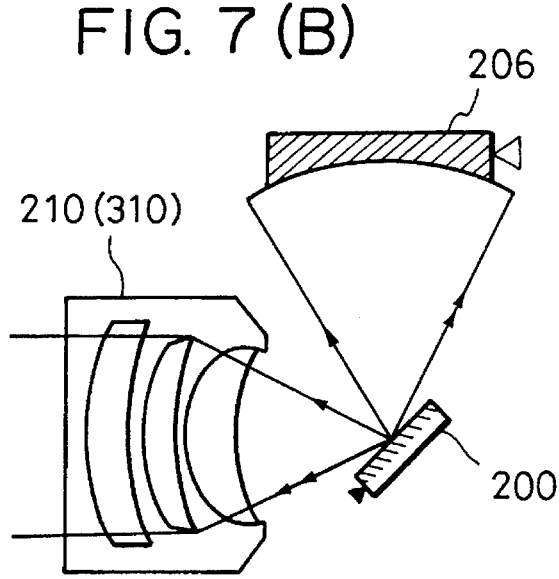
Figure 7C:
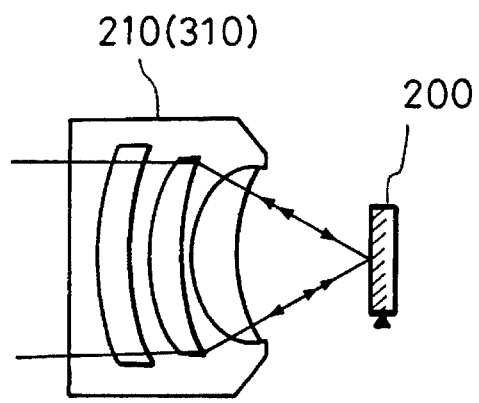

FIGS. 7(A), 7(B) and 7(C) respectively illustrate measurement systems 1, 2 and 3 in which the positional relation between the condenser lens 210 and the object to be measured 206, when the surface shape of the object to be measured 206 is measured, differs from each other.

The plane mirror 200 is disposed movably or detachably near the focusing line of the condenser lens 210.

In this embodiment, the measurement operation is conducted in each of the measuring systems 1, 2 and 3 shown in FIGS. 7(A), 7B) and 7(C), and the system errors are measured from the results of the measurement operations which are conducted three times in total. The surface shape errors of the object to be measured 206 are corrected using the obtained system errors.

FIG. 7(A) shows the measurement system 1 in which the focusing line of the condenser lens 210 is substantially coincident with the focusing line of the object to be measured 206 which is supported by the jig 206A. The measurement data obtained by the CCD camera 108 in this system is $W_1(x, y)$.

FIG. 7 (B) shows the measurement system 2 in which the light is made incident on the object to be measured 206 supported by the jib 206B after it has been deflected by about 90 degrees by the plane mirror 200 disposed near the focusing line of the condenser lens 210. The measurement data obtained by the CCD camera 108 in this system is $W_2(x, y)$.

FIG. 7 (C) shows the measurement system 3 in which the light from the plane mirror 200, disposed near the focusing line of the condenser lens 210, is reflected directly to the condenser lens 210, i.e., so-called cat-eye reflected to the condenser lens 210. The measurement data obtained by the CCD camera 108 in this system is $W_3(x, y)$. The triangle mark attached to the object to be measured 206 indicates the direction of the object to be measured 206.

In this embodiment, each of the measurement results obtained by the corresponding measuring systems 1, 2 and 3 is considered to be the difference between the wavefront errors in the measuring optical path and those in the reference optical path, and is given by:

$$W_1(x, y) = W_M(x, y) - W_R(x, y) \tag{27}$$

$$W_2(x, y) = W_M'(x, y) - W_R(x, y) \tag{28}$$

$$W_3(x, y) = W_C(x, y) - W_R(x, y) \tag{29}$$

where $W_R$ represents the wavefront of the reference light, $W_M$ represents the wavefront of the measured light, which has been reflected at the surface measuring position of the object to be measured in the measurement system 1, $W_M'$ represents the wave front of the measured light reflected by the object to be measured 206 after it has been bent by about 90 degrees by the plane mirror disposed on the focusing line thereof, and $W_C$ represents the wavefront of the measured light cat's eye reflected in the measurement system 3.

Under the assumption that the wavefront aberration does not change as the wave light propagates, $W_R$, $W_M$, $W_M'$ and $W_C$ are given by $$W_R(x, y) = W_i(x, y) + W_r(x, y) \tag{30}$$

$$W_M(x, y) = W_i(x, y) + W_L(x, y) + W_S(x, y) \tag{31}$$

$$W_M'(x, y) = W_i(x, y) + W_L(x, y) + W_b(x, y) + W_S(x, -y) \tag{32}$$

$$W_C(x, y) = W_i(x, -y) + \{W_L(x, y) + W_L(x, -y) + W_b(x, y)\}/2 \tag{33}$$

where $W_i(x, y)$ represents the wave front errors of the light source, $W_r(x, y)$ represents the wave front errors (x2) of the reference mirror 105, $W_L(x, y)$ represents the wavefront errors (x2) of the condenser lens 210, $W_S$ represents the wavefront errors (x2) of the object to be measured 206, and $W_b$ represents the wavefront errors (x2) of the bending plane mirror.

From equations (27) through (33), we have an equation (34) which expresses the system errors of the entire apparatus as follows:

$$\{W_1(x, y) - W_2(x, y) + W_3(x, y) + W_3(x, -y)\}/2 = \tag{34}$$

$$W_L(x, y) - W_r(x, y) - W_b(x, -y)/2 +$$

$$\{W_b(x, y) + W_b(x, -y)\}/4$$

Since the wavefront errors of the bending plane mirror are reflected in a very narrow range in the y direction, $W_b(x, y) = W_b(x, -y)$. Therefore, we have $$\{W_1(x, y) - W_2(x, -y) + W_3(x, y) + W_3(x, -y)\}/2 = W_L(x, y) - W_r(x, y) \tag{35}$$

In this embodiment, the system errors given by the equation (35) are calculated, and the calculated system errors are stored in the computer 109 which also serves as the storage means. When various objects to be measured are measured, the measurement errors are corrected using the system errors stored in the storage means (e.g., by subtracting the stored errors from the measured value). Consequently, highly accurate measurement of the surface shape is enabled.

In this embodiment, a predetermined cylindrical object to be measured, which is other than the object to be measured 206, may be employed to calculate the system errors.

Furthermore, although the system errors are stored in the storage means in this embodiment, they may be obtained for correction of the measured value each time measurement is conducted.

As mentioned above, a total of three measurement operations are conducted in this embodiment to obtain the measurement data, and the measurement data obtained in respective operations are calculated to obtain the system errors which indicate the error components inherent to the interferometer system. Therefore, the system errors can be eliminated from the data obtained in the subsequent measurement operations so as to achieve a highly accurate measurement of the surface shape.

Figure 8:
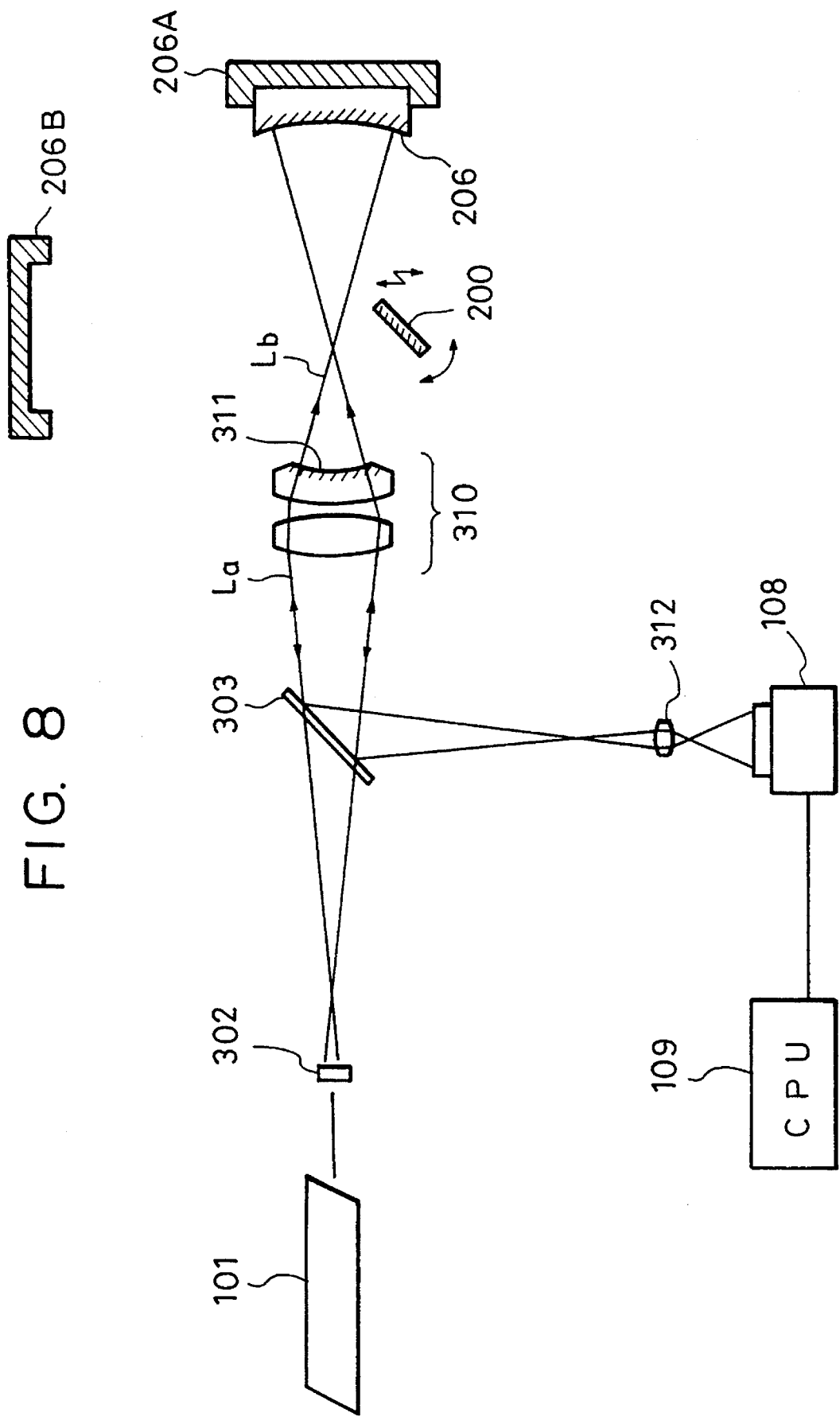
FIG. 8 is a schematic view of the essential parts of a fourth embodiment according to the present invention.

FIG. 8 is a schematic view of the essential parts of a fourth embodiment in which the interference measuring apparatus according to the present invention is applied to a Fizeau interferometer.

In FIG. 8, reference numeral 101 denotes a laser serving as the light source, reference numeral 302 denotes a diverging lens for diverging the laser beam coming from the laser 101, and reference numeral 303 denotes a half mirror. Reference numeral 310 denotes a condenser lens for generating a reference cylindrical wavefront from the incident light, reference numeral 311 denotes the final lens surface of a condenser lens system 310, which serves as a reference surface, and reference numeral 206 denotes an object to be measured having the shape representing a portion of a cylinder. Reference numeral 312 denotes a lens, reference numeral 108 denotes a CCD camera for observing the interference fringes and reference numeral 109 denotes a computer which operates an interference fringe image.

In the thus-arranged structure, the coherent rays of light emerging from the light source 101 are diverged by the diverging lens 302. The condenser lens 310 converts the diverged light, which has passed through the half mirror 303, into a cylindrical light wave. Also, the condenser lens 310 divides the cylindrical light wave into a light La to be reflected by the final lens surface 311 thereof and a light Lb to be directed toward the object to be measured.

The light Lb, which has been directed toward the object to be measured 206, is reflected by the cylindrical object to be measured 206. The reflected light Lb passes through the condenser lens 310 again and is then reflected by the half mirror 303 together with the light La, which has been reflected by the final lens surface of the condenser lens 310. The reflected lights La and Lb pass through the lens 312 and form interference fringes on the CCD camera 108. The computer 109 computes the interference fringes formed on the CCD camera 108 to interpolate the phase difference for each of the CCD pixels.

In this embodiment, the system errors are measured in the same manner as that in the measuring systems 1, 2 and 3 respectively shown in FIGS. 7(A), 7(B) and 7(C).

In this embodiment, the measurement data obtained in the measuring systems 1, 2 and 3 respectively shown in FIGS. 7(A), 7(B) and 7(C) are $W_1(x, y)$, $W_2(x, y)$, and $W_3(x, y)$, respectively, as in the case of the first embodiment.

In this embodiment, each of the measurement results obtained by the corresponding measuring systems 1, 2 and 3 is considered to be the difference between the wavefront errors in the measuring optical path and those in the reference optical path, and is given by:

$$W_1(x, y) = W_M(x, y) - W_R(x, y) \tag{36}$$

$$W_2(x, y) = W_{M'}(x, y) - W_R(x, y) \tag{37}$$

$$W_3(x, y) = W_C(x, y) - W_R(x, y) \tag{38}$$

where $W_R$ represents the wavefront of the reference light, $W_H$ represents the wavefront of the measured light which has been reflected at the surface measuring position of the object to be measured in the measurement system 1, $W_{H'}$ represents the wavefront of the measured light reflected by the object to be measured after it has been bent by about degrees by the plane mirror disposed on the focusing line thereof, and $W_C$ represents the wavefront of the measured light cat's eye reflected in the measurement system 3. Under the assumption that the wavefront aberration does not change as the wave light propagates, $W_R$, $W_M$, $W_{M'}$ and $W_C$ are given by $$W_R(x, y) = W_i(x, y) + W_L(x, y) + n \cdot W_r(x, y) \tag{39}$$

$$W_M(x, y) = W_i(x, y) + W_L(x, y) + (n-1) \cdot W_r(x, y) + W_S(x, y) \tag{40}$$

$$W_{M'}(x, y) = W_i(x, y) + W_L(x, y) + (n-1) \cdot W_r(x, y) + \tag{41}$$

$$W_b(x, y) + W_S(x, -y)$$

$$W_C(x, y) = W_i(x, -y) + \{W_L(x, y) + (n-1) \cdot \tag{42}$$

$$W_r(x, y) + (n-1) \cdot W_r(x, -y) + W_L(x, -y) + W_b(x, y)\}/2$$

where $W_i(x, y)$ represents the wavefront errors of the light source, $W_r(x, y)$ represents the wavefront errors (x2) of the reference mirror 105, $W_L(x, y)$ represents the wavefront errors (x2) of the condenser lens 310 except for the final lens surface 311, $W_S$ represents the wave front errors (x2) of the object to be measured 206, and n is the refraction factor of the final lens.

From equations (36) through (47), we have an equation (43) which expresses the system errors $[-W_r(x, y)]$ of the entire apparatus as follows:

$$-W_r(x, y) = \{W_1(x, y) - W_2(x, -y) + W_3(x, y) + W_3(x, -y)\}/2 \tag{43}$$

Equation (43) is similar to equation (35). That is, the system errors can be obtained in exactly the same manner in both a Fizeau interferometer system and a Twyman-Green interferometer system according to the present invention.

As will be understood from the foregoing description, it is possible according to the present invention to provide a method of measuring a cylindrical shape in which the optical surface shape of an object to be measured, such as a cylindrical lens or a cylindrical mirror, can be measured with a high degree of accuracy by correcting system errors, as well as an interference measuring apparatus which employs such a method.

Except as otherwise disclosed herein, the various components shown in outline or in block form in the figures are individually well-known in their internal construction and operation and are not critical either to the making of or using of this invention or to a description on the best mode of the invention.

While the present invention has been described with respect to what is presently considered to be the preferred embodiments, it is to be understood that: the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of measuring system error of an apparatus which measures a cylindrical shape using an interferometer designed to produce interference from a light wave having a cylindrical wavefront formed by a condenser system and reflected by a cylindrical surface to be measured of the cylindrical shape after emission thereof from the condenser system, said system error measuring method comprising the steps of:

performing a first measurement operation using the interferometer under a condition that a predetermined cylindrical surface is disposed so that a focusing line of the condenser system substantially coincides with a center line of curvature of the predetermined cylindrical surface and the light wave emitted from the condenser system is incident on the predetermined cylindrical surface;

performing a second measurement operation using the interferometer under a condition that a reflecting member is disposed near the focusing line of the condenser system and the predetermined cylindrical surface is disposed so that the light wave emitted from the condenser system is made incident on the predetermined cylindrical surface by the reflecting member;

performing a third measurement operation using the interferometer wherein one of the following conditions is satisfied: (1) the predetermined cylindrical surface is disposed near the focusing line of the condenser system or (2) the reflecting member is disposed near the focusing line of the condenser system so that the light from the reflecting member is reflected directly to the condenser system; and calculating the system error of the apparatus on the basis of the results of said first, second and third measurement operations.

2. The method of measuring system error according to claim 1, wherein the interferometer is a Twyman-Green interferometer.

3. The method of measuring system error according to claim 1, wherein the interferometer is a Fizeau interferometer.

4. The method of measuring system error according to claim 1, further comprising performing said first, second and third measurement operations by operating, by a computer, images of interference fringes obtained using the interferometer.

5. The method of measuring error according to claim 1, wherein the cylinder that is used in performing the first, second and third measurement operations has a predetermined cylindrical shape.

6. An apparatus for measuring a cylindrical shape, said apparatus comprising:

an interferometer having a condenser system for emitting a light beam, said interferometer producing interference from a light wave having a cylindrical wavefront formed by said condenser system and reflected by a cylindrical surface to be measured after the light wave has been emitted from said condenser system;

a detection system for detecting interference fringes generated by the interference produced by said interferometer; and an operation system for measuring the shape of the cylindrical surface to be measured on the basis of the detection of said detection system, said operation system being capable of calculating the system errors of said apparatus on the basis of data from the interference fringes obtained using said interferometer under conditions of:

i) a first measurement arrangement of said detection system, wherein a predetermined cylindrical surface is disposed so that a focusing line of said condenser system substantially coincides with a center line of curvature of the predetermined cylindrical surface and the light wave emitted from said condenser system is incident on the predetermined cylindrical surface;

ii) a second measurement arrangement of said detection system, wherein a reflecting member is disposed near the focusing line of said condenser system and the predetermined cylindrical surface is disposed so that the light wave emitted from said condenser system is made incident on the predetermined cylindrical surface by said reflecting member;

iii) a third measurement arrangement of said detection system, wherein one of the following conditions is satisfied: (1) the predetermined cylindrical surface is disposed near the focusing line of said condenser system or (2) said reflecting member is disposed near the focusing line of said condenser system so the light from said reflecting member is reflected directly to said condenser system, wherein said operation system stores the calculated system error of said apparatus, and corrects the results of subsequent measurements of the shape of said cylindrical surface to be measured on the basis of the stored data.

7. The apparatus for measuring a cylindrical shape according to claim 6, wherein said interferometer is a Twyman-Green interferometer.

8. The apparatus for measuring a cylindrical shape according to claim 6, wherein said interferometer is a Fizeau interferometer.

9. The apparatus for measuring a cylindrical shape according to claim 6, wherein said operation system operates images of interference fringes detected by said detection system.

10. The apparatus for measuring a cylindrical shape according to claim 6, wherein said detection system comprises two-dimensional imaging means.

11. The apparatus for measuring a cylindrical shape according to claim 6, wherein said interferometer produces the interference fringes by adding the reflected light from said cylindrical surface to be measured to light reflected from a reference surface.

12. An apparatus for measuring a cylindrical shape according to claim 6, wherein the cylinder that is used to obtain the data in said first, second and third measurement operations has a predetermined cylindrical shape.

* * * * *

UNITED STATES PATENT AND TRADEMARK OFFICE
CERTIFICATE OF CORRECTION

PATENT NO. : 5,485,275

DATED : January 16, 1996

INVENTOR(S) : Ohtsuka

It is certified that error appears in the above-indentified patent and that said Letters Patent is hereby corrected as shown below:

Title page, item
[54] Title: Col. 1, line 3,

"MEASURE" should read --MEASURES--.

COLUMN 1:

Line 3, "MEASURE" should read --MEASURES--.

COLUMN 3,

Line 30, "wave front" should read --wavefront--;
Line 32, "lens 120" should read --lens 110--; and
Line 33, "wave front" should read --wavefront--.

COLUMN 7:

Line 54, "$W_H$" should read --$W_M$--;
Line 60, "wave front" should read --wavefront--; and
Line 64, "wave front" should read --wavefront--.

COLUMN 8:

Line 36, "numeral.311" should read --numeral 311--.

COLUMN 9:

Line 22, "wave front" should read --wavefront--; and
Line 23, "by" should read --by:--.

UNITED STATES PATENT AND TRADEMARK OFFICE
CERTIFICATE OF CORRECTION

PATENT NO. : 5,485,275
DATED : January 16, 1996
INVENTOR(S) : Ohtsuka

It is certified that error appears in the above-indentified patent and that said Letters Patent is hereby corrected as shown below:

COLUMN 11:

Line 43, "jib" should read --jig--.

COLUMN 12:

Line 39, "$W_3(x,-y)\{/2$" should read --$W_3(x,-y)\}/2$--.

COLUMN 13:

Line 59, "$W_H'$" should read --$W_M'$--; and
  Line 62, "degrees" should read --90 degrees--.

COLUMN 14:

Line 44, "that:" should read --that--.

COLUMN 15:

Line 32, "error" should read --system error--.

Signed and Sealed this

Fourth Day of June, 1996

Attest:

BRUCE LEHMAN

*Attesting Officer*   *Commissioner of Patents and Trademarks*